United States Patent [19]

West

[11] 3,725,726

[45] Apr. 3, 1973

[54] CRT GEOMETRY CORRECTION WITH ZERO OFFSET

[76] Inventor: Roger Frankland West, Weston, Conn.

[73] Assignee: United Aircraft Corporation, East Hartford, Conn.

[22] Filed: Dec. 21, 1970

[21] Appl. No.: 100,231

[52] U.S. Cl. ..........315/27 GD

[51] Int. Cl. ..........H01j 29/70

[58] Field of Search......307/228; 315/27 TD, 27 GD, 315/27 R

[56] References Cited

UNITED STATES PATENTS

| | | | |
|---|---|---|---|
| 3,402,320 | 9/1968 | Christopher | 315/27 TD |
| 3,586,874 | 6/1971 | Ferro | 307/228 |

OTHER PUBLICATIONS

"Pulse, Digital, and Switching Waveforms," Millman & Taub, pg. 17, 1965

*Primary Examiner*—Carl D. Quarforth
*Assistant Examiner*—J. M. Potenza
*Attorney*—Melvin Pearson Williams

[57] ABSTRACT

A sawtooth driving voltage for deflecting the beam in a cathode ray tube has centering and geometry distortion correction provided by means of a feedback path including an integrator which adds a substantially parabolic function back to a summing input to the amplifier which is providing the deflection voltage.

2 Claims, 1 Drawing Figure

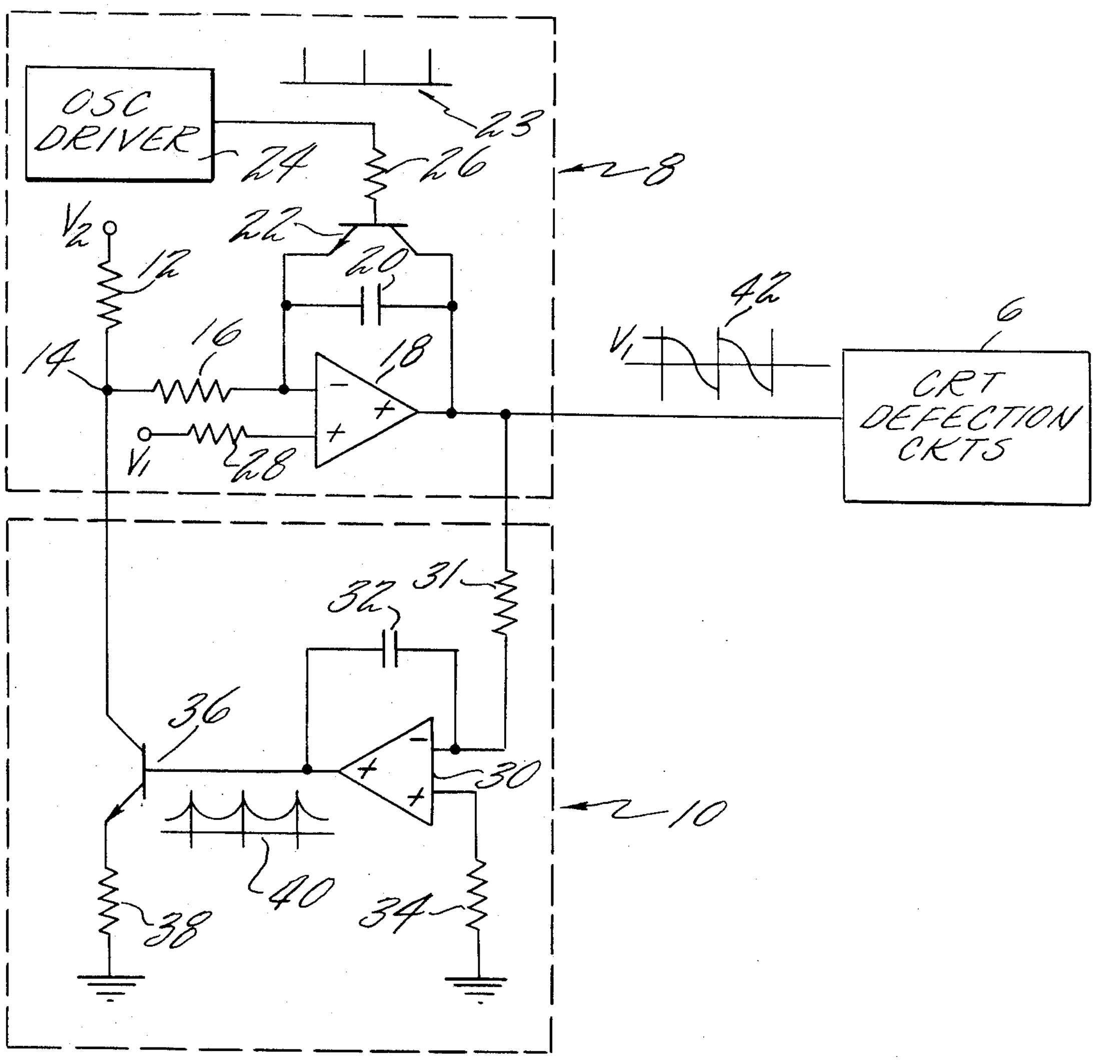
INVENTOR
ROGER F. WEST
BY Melvin Pearson Williams
ATTORNEY

CRT GEOMETRY CORRECTION WITH ZERO OFFSET

BACKGROUND OF THE INVENTION

1. Field of Invention

This invention relates to cathode ray tube deflection circuitry, and more particularly to improvements relating to obtaining zero offset and correcting for geometry distortion.

2. Description of the Prior Art

It has long been known in the utilization of cathode ray tube display devices that a desirable waveform for sweeping of the beam across the face of the tube is in the nature of a sawtooth: that is, the spot should trace the face of the screen at a linear rate and then snap back to the other side of the screen when the trace is completed. As is known, when the face of the CRT is spherical, the uniform sweeping of the beam will cause a uniform advancement of the spot created by the beam across the face of the tube. However, when the screen is flat, a uniform tracing of the beam will cause the spot to move more rapidly at wide angles (near the edges of the screen) and relatively more slowly at narrow angles of sweep (near the center of the screen). Thus a non-uniform speed of the spot created by the beam on the face of the screen results when a flat tube is used without proper sweep correction. The correction for this form of geometry distortion in a CRT sweep voltage is referred to variously as geometry distortion correction, pincushion correction, and " S" correction. Various circuits have been devised to provide this correction, but in all cases these circuits are very complex, which tends to make them unreliable and expensive.

Another factor in CRT deflection voltages is the effects of undesirable offset. An offset in the voltage (that is, the deflection voltage not being centered around ground or other reference potential) can result from aging of components, variations in circuit voltages, and from other well known characteristics of electronic circuitry. Typical prior art geometry distortion correction circuits may employ such techniques as summing a correction factor at the output of the sawtooth sweep voltage generating means; but this does not provide centering stabilization.

SUMMARY OF THE INVENTION

The object of the present invention is to provide improved deflection voltage generation which corrects for undesirable offset as well as for geometry distortion.

According to the present invention, circuitry including an amplifier which provides the basic sawtooth deflection voltage for a cathode ray tube sweep includes integrating feedback, whereby the deflection voltage is stabilized without offset and is corrected for geometry distortion. In accordance with the invention, the integrating feedback provides a substantially parabolic waveform which is added into the sawtooth generation circuitry so as to provide a waveform in which the peaks are rounded slightly, thereby slowing the deflection rate at wide angles of deflection. In accordance with the invention in one form, a sawtooth generator comprises an operational amplifier strapped with a capacitor which is periodically short circuited, and integrating feedback is provided in the form of a substantially parabolic current which is added to a substantially linear current at the inverting input of the operational amplifier.

The present invention not only simplifies the correction for geometry distortion of the CRT display, but also provides for undesirable offset correction, thereby eliminating offsets in the average value of the voltage, not heretofore provided by comparable waveform correction circuits known to the art. The invention may readily be implemented in a variety of forms utilizing standard technology, and with relatively simple circuitry.

Other objects, features and advantages of the present invention will become more apparent in the light of the following detailed description of preferred embodiments thereof as illustrated in the accompanying drawing.

BRIEF DESCRIPTION OF THE DRAWING

The sole FIGURE herein is a schematic block diagram of a preferred embodiment of the present invention.

DESCRIPTION OF THE PREFERRED EMBODIMENT

Referring now to the drawing, CRT deflection circuits 6 of any suitable known type are fed a substantially sawtooth deflection voltage generated in a sawtooth waveform generator 8 of a known type. The improvements of the present invention are provided by integrating feedback circuitry 10 which is connected across the sawtooth waveform generator 8. Consider first the circuitry 8 operating without the circuitry 10. In the sawtooth waveform generator 8, a positive voltage source V2 is connected through a resistor 12 to a summing point 14 and through a resistor 16 to the inverting input of an operational amplifier 18. The operational amplifier 18 is strapped with a capacitor 20 which in turn may be short circuited by a suitable switch, such as a transistor 22, which is operative in response to signals provided thereto by an oscillator driver circuit 24 through a resistor 26. The oscillator driver 24 provides narrow voltage pulses to the base of the transistor 22 (as shown by waveform 23) to cause the transistor 22 to periodically saturate for short periods of time, thereby short circuiting the capacitor 20. When the transistor 22 is not conducting, a constant current is provided from the voltage source V2 through the resistors 12, 16 and the capacitor 20 so as to cause a linear voltage to be generated across the capacitor 20. Since the amplifier 18 is a high gain operational amplifier, operation in an unsaturated mode occurs when the difference between the inverting input to the amplifier and the non-inverting input to the amplifier is very small. With the capacitor 20 providing negative feedback to the inverting input to the amplifier, the inverting input will assume substantially the potential of the non-inverting input at all times. The non-inverting input to the amplifier 18 is connected through a resistor 28 to a second voltage source V1, which has to have a potential less than that of the voltage source V2. The inverting input is always the same as the potential of source V1, and the source V2 is constant, so there is a constant current through the resistors 12, 16. And since the high gain operational amplifier 18 draws no current whatsoever, there is a constant current through the capacitor 20 which, as is known, creates a linearly changing voltage. In the present case, the direction of current is such that with zero volts across the capacitor 20, the output is at the potential of the source V1, and as current is integrated over time in the capacitor 20, this voltage decreases linearly. The timing of the oscillator driver 24 is suitable adjusted to cause the time interval to be that which will integrate the current through the resistors 12, 16, to a voltage which is twice that of the source V1; thus, a sawtooth is established between plus V1 and minus V1. Of course, when transistor 22 operates, it short circuits the capacitor 20, so there is no longer any voltage across it, and the voltage at the output resumes that of the inverting input, which is the same as the source V1.

The improvement in accordance with the present invention comprises the integrating circuit 10 composed of a high gain operational amplifier 30, connected to the output of the amplifier 18 by a resistor 31, which is provided with negative capacitive feedback by means of a capacitor 32, the non-inverting input of the amplifier 30 being connected to ground through a resistor 34. The output of the amplifier 30 is connected to the base of a transistor 36 which has its emitter connected to ground through a resistor 38 and its collector connected to the summing point 14. In operation, the transistor 36 provides a current which is a function of the output voltage of the amplifier 30, which current can add with the constant current through the resistors 12, 16 as described hereinbefore. As is known, the integral of a ramp function is substantially parabolic, as illustrated by the waveform 40. The polarities are such that when the output of the amplifier 18 is positive, the output of the amplifier 30 becomes less positive, which tends to reduce the current flow through the transistor 36. The net effect is that the current flow through the transistor 36 must be subtracted from the constant current provided through the resistor 12 thereby changing the current through the resistor 16 and capacitor 20, which integrates to a different voltage over the time interval established by the oscillator driver 24 in such a fashion as to round off the peaks of the sawtooth waveform output of the amplifier 18 as illustrated by the waveform 42.

An essential feature of the present invention is that integration be provided in the feedback path to not only alter the sawtooth voltage generation through feedback, but since any non-zero average with respect to the integrator reference in the output voltage would be integrated, the integrator output would change in a direction to cause the non-zero average to be negligible. The use of feedback thereby eliminates any tendency for the output of the amplifier 18 to have other than a zero average: in other words, the voltage will be properly centered about ground or other suitable reference potential as a result of the integrating feedback. The reference potential which is established at the output of the amplifier 18 is that to which the non-inverting input to the amplifier 30 is connected by the resistor 34, which in this case is ground.

Once the circuitry 10 is connected in feedback relationship with the amplifier 18, the amplifier 18 no longer provides a true sawtooth, whereby the integral is no longer a true parabolic term; however since the output is substantially sawtooth and the integral is substantially parabolic, it provides a suitable rounding of the peaks to create a substantially linear trace across a non spherical face of the CRT.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. Sawtooth voltage waveform generating means comprising:

means including an integrating amplifier for generating a substantially sawtooth voltage waveform at the output of said amplifier; and negative integrating feedback means referred to a reference potential source, said feedback means applied from the output of said amplifier to a summing network connected to the input of said amplifier for correcting geometry distortion and stabilizing said sawtooth waveform to cause a non-zero average thereof to be negligible with respect to said reference potential.

2. Sawtooth voltage waveform generating means according to claim 1 wherein:

said integrating feedback means comprises an operational amplifier having said reference potential applied to the non-inverting input thereof, the input to said integrating feedback means connected to the output of said sawtooth waveform generating means for providing signals to said summing network for correction geometry distortion and stabilizing said sawtooth waveform to cause a non-zero average thereof to be negligible with respect to said reference potential.

* * * * *